Oct. 24, 1950 — L. R. PHILLIPS — 2,526,828
ILLUMINATING AND VENTILATING APPARATUS
Filed May 1, 1947 — 2 Sheets-Sheet 1

Leonard R. Phillips,
By Carroll Bailey, Attorney

Oct. 24, 1950     L. R. PHILLIPS     2,526,828
ILLUMINATING AND VENTILATING APPARATUS
Filed May 1, 1947     2 Sheets-Sheet 2
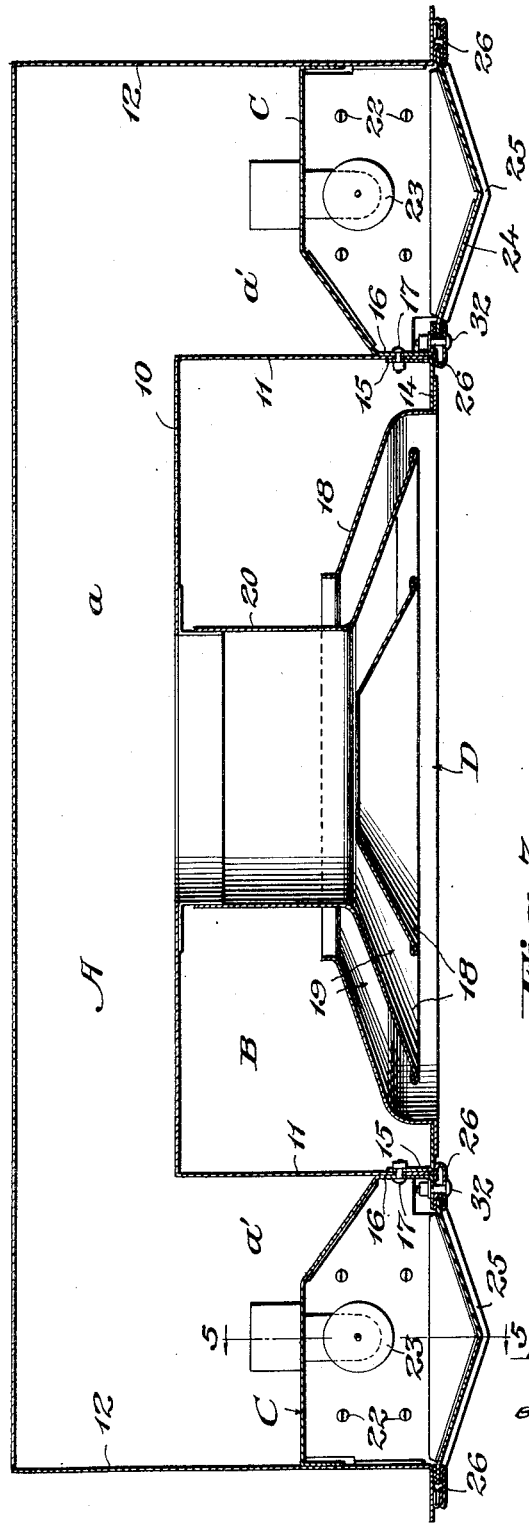
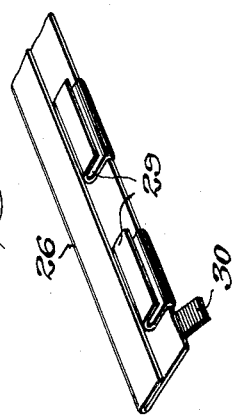
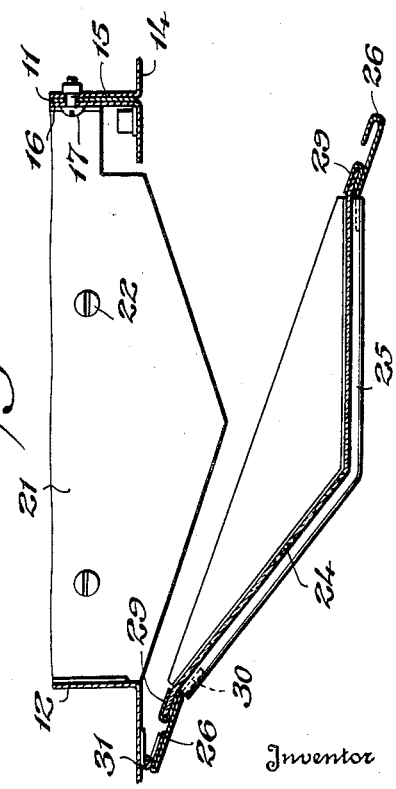
Inventor
Leonard R. Phillips,
by Carroll Bailey
Attorney Patented Oct. 24, 1950

2,526,828

UNITED STATES PATENT OFFICE 2,526,828

ILLUMINATING AND VENTILATING APPARATUS

Leonard R. Phillips, Teaneck, N. J., assignor to Anemostat Corporation of America, New York, N. Y., a corporation of Delaware Application May 1, 1947, Serial No. 745,125

8 Claims. (Cl. 138—74)

This invention relates to illuminating and air supply and, if desired, air exhaust apparatus, particularly for use in illuminating and supplying air for ventilating, heating or cooling purposes to long, narrow enclosures such as railway cars, motor buses, aircraft cabins, building hallways and the like, and, if desired, for exhausting air from such enclosures, although not limited to such uses, and has generally in view to provide a novel, compact air duct and light fixture casing combination which is susceptible of ready pre-fabrication and installation, which, when installed, is of attractive appearance, and which embodies a structural combination and arrangement of parts affording ready access to the air duct, or ducts, and to the light fixture casing thereof for cleaning, repair or other purposes.

With the foregoing and other objects in view, which will become more fully apparent as the nature of the invention is better understood, the same consists in apparatus for the purposes stated embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Fig. 2 is a cross section on an enlarged scale taken on the line 2—2 of Fig. 1.

Fig. 3 is an enlarged cross sectional view through one of the casings of the illuminating means of the apparatus showing the bottom closure of the casing in a partly open position.

Fig. 4 is a fragmentary perspective view of a frame element of one of the bottom closures of one of the casings of the illuminating means.

Figure 1:
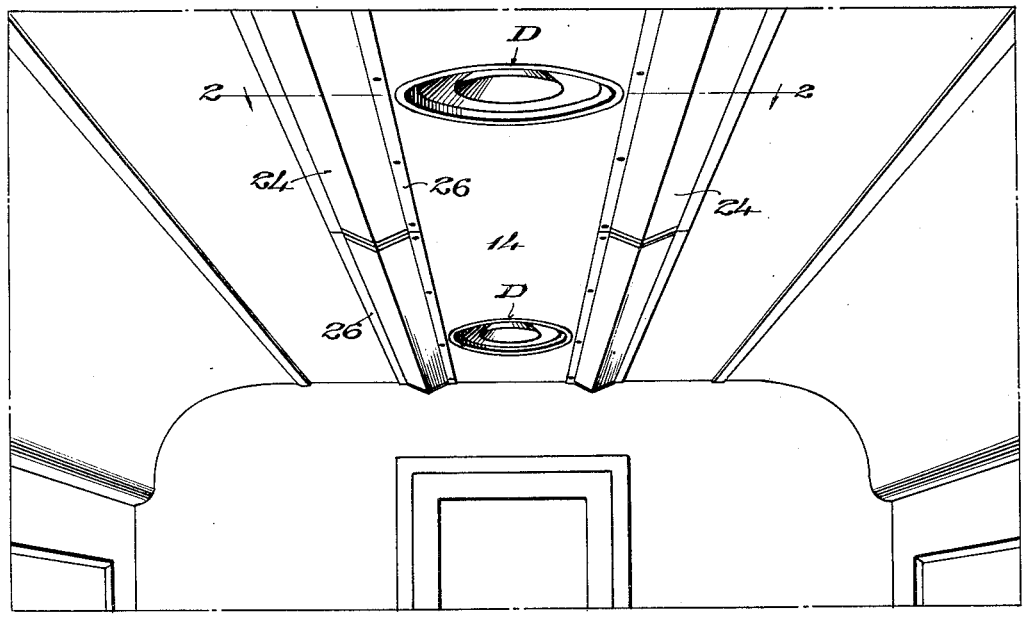
Fig. 1 is a perspective view of a portion of a railway car illustrating apparatus in accordance with the invention installed therein.
Figure 5:
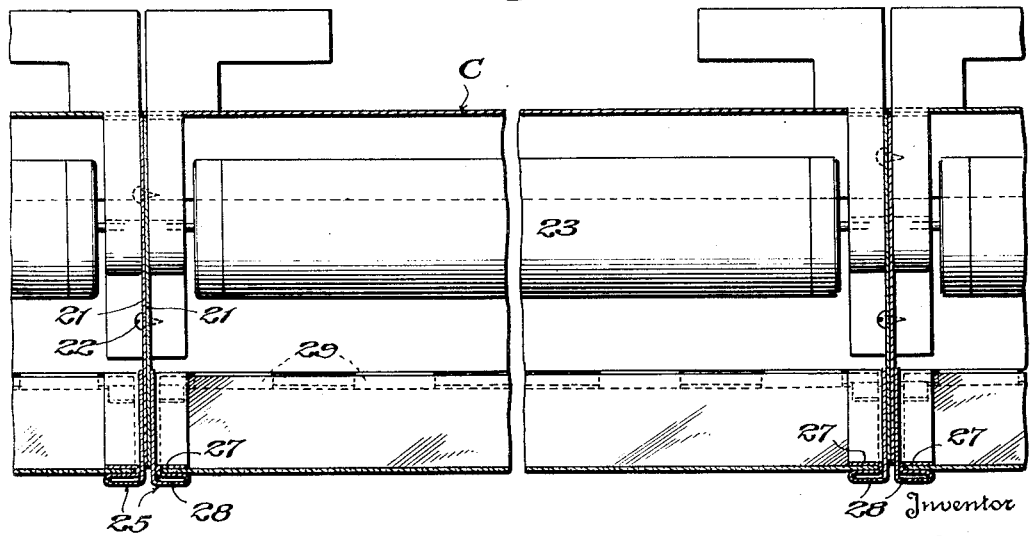
Fig. 5 is a longitudinal section on an enlarged scale taken on the line 5—5 of Fig. 2.

Referring in detail to the specific embodiment of the invention illustrated in the drawings, A and B designate a pair of elongated air ducts, both of which may be for the supply of air for ventilating, heating or cooling purposes, or one of which may be for the supply of air for either of these purposes and the other of which may be for air exhaust purposes.

The duct A is of inverted U-shape in cross section and consists of a central portion $a$ and depending side portions $a'$, $a'$. On the other hand, the duct B is of rectangular shape in cross section and is disposed beneath the central portion $a$ and between the depending side portions $a'$, $a'$ of the duct A. The two ducts thus are disposed compactly relative to each other with the top and the side walls 10 and 11, respectively, of the duct B constituting the bottom wall of the central portion $a$ and the inner side walls of the side portions $a'$, $a'$, respectively, of the duct A.

The side portions $a'$, $a'$ of the duct A are closed at their bottoms by light fixture casings C, C which are co-extensive in length with the ducts A and B and which are fastened to the outer side walls 12, 12 of the duct A in any suitable manner as, for example, by spot welding.

The duct B includes a removable bottom wall 14 which has upstanding flanges 15, 15 at its sides disposed against the side walls 11, 11 of said ducts. The said side walls 11, 11 of said duct B are disposed against the inner side walls 16, 16 of the light fixture casings C, C and said side walls 11, 11 and the flanges 15 are detachably secured together and to the said inner side walls 16 of the light fixture casings C by bolts 17 or other suitable fasteners. Thus, the bottom of the duct B is readily removable to afford access to said duct B for cleaning or other purposes, and the duct B is readily removable to afford access to the duct A for cleaning or other purposes.

At suitable points spaced along its length the bottom wall 14 of the duct B is provided with openings wherein are arranged air outlet or combined air outlet and inlet devices D of any suitable type. Such devices are illustrated in the drawings as being of a known type comprising a plurality of open-ended, hollow, flaring members 18 spaced apart to provide a series of open-ended air passageways 19, between them. The top wall 10 of the duct B has openings therein alined with the openings in its bottom wall 14, and the devices D have necks 20 extending upwardly from intermediate of their flaring members 18 and connected to the duct A through the openings in said wall 10. According to the construction illustrated in the drawings, both ducts A and B are for the supply of air and the devices D are solely for the delivery of air. Either duct may, however, be for the delivery of air and the other duct may be for the exhaust of air. If both ducts are for the delivery of air, one duct may be for the supply of air for heating purposes and the other may be for the supply of air for cooling purposes, and the devices D may be constructed to deliver the air for heating purposes in a manner different from the delivery of air for cooling purposes, all as is well known in the art and with which the present invention is not particularly concerned. Alternatively, the duct B may be eliminated, in which event the bottom wall of said duct may be employed as a closure for the central, bottom portion of the duct A which then will be used solely for the delivery of air for ventilating, heating or cooling purposes.

The ducts A and B and the light fixture casings C which may be either continuous lengthwise or formed in sections of any suitable length secured together in end to end relationship to each other in any suitable manner. In the present instance the light fixture casings C are illustrated as being formed in sections having end walls 21 and as being secured together in end to end relationship to each other by suitable fasteners such as screws 22 connecting their end walls.

Each light fixture casing section has suitably mounted therein a source of illumination such as an electric light tube 23, and the bottom of each light fixture casing is closed by a pane 24 of any suitable material through which light may pass for illuminating purposes.

The panes 24 may be of any desired cross sectional shape, but preferably are of shallow V-shape in cross section as shown. In any event, each pane is mounted in a frame comprising end and side finishing strips 25 and 26, respectively, of sheet metal or other suitable sheet material which serve not only to protect and reinforce the pane, but as a means of operatively mounting it relative to its related light fixture casing.

The end finishing strips 25 are bent into S-shape in cross section to provide inner U-shaped formations 27 to receive the marginal end portions of the pane 24 and outer U-shaped finishing formations 28.

The side finishing strips 26 are bent upon themselves along their inner sides to provide U-shaped formations 29 to receive the side marginal portions of the pane 24 and along their outer sides preferably are turned upwardly and inwardly upon themselves to reinforce the strips and to avoid exposed sharp edges. Adjacent to their ends the side finishing strips 26 are provided with tongues 30 which are disposed in the end portions of the outer U-shaped formations 28 of the end finishing strips 25 and which are welded or otherwise suitably secured therein, whereby the frame elements are securely fastened together.

One of the side finishing strips 26 is suitably hinged, as indicated at 31, to adapt the pane 24 to be swung between open and closed positions relative to the bottom of its related light fixture casing section, while any suitable fastening means, such as the screws indicated at 32, may be provided for cooperation with the other side finishing strip to secure the pane 24 in its closed position.

The apparatus is intended to be mounted at the top of a long, narrow enclosure, such as a railway car or the like as illustrated in Fig. 1 of the drawings, to illuminate the enclosure and to supply air thereto for ventilating, heating or cooling purposes as well as, in some instances, to carry off air from the enclosure if desired. In any event, the apparatus obviously is compact, may be of shallow depth which is important as concerns its use in enclosures of low height, and presents an attractive appearance when installed. Moreover, the apparatus obviously is susceptible of advantageous pre-fabrication and ready assembly and installation. Furthermore, it provides for ready access to the light fixture casings and to the air duct, or ducts, for cleaning, repair or other purposes.

From the foregoing description considered in connection with the accompanying drawings, it is believed that the construction of the apparatus will be clear and its advantages appreciated. It is desired to point out, however, that while only a single structural embodiment of the invention has been illustrated and described, the same is readily capable of specifically different structural embodiments within its spirit and scope as defined in the appended claims.

I claim:

1. Apparatus of the character described comprising a first elongated air duct of substantially inverted U-shape in cross section including a top portion and a pair of side portions depending therefrom, a second elongated air duct below the top portion and between the side portions of said first mentioned air duct, and a pair of light fixture elements constituting closures for the bottoms of the side portions of said first mentioned air duct.

2. Apparatus of the character described comprising a first elongated air duct of substantially inverted U-shape in cross section including a pair of light fixture casings constituting closures for the bottoms of its side portions, and a second elongated air duct beneath the central portion and between the side portions of said first air duct, the top and the side walls of said second air duct constituting the medial portion of the bottom and the inner side walls, respectively, of said first air duct.

3. Apparatus of the character described comprising an elongated air duct including a pair of elongated light fixture casings constituting closures for side portions of its bottom, the medial bottom wall portion of said air duct being detachably fastened to the inner side walls of said light fixture casings to afford access to said air duct.

4. Apparatus of the character described comprising a first elongated air duct of substantially inverted U-shape in cross section including a pair of light fixture casings constituting closures for the bottoms of its side portions, a second elongated air duct beneath the central portion and between the side portions of said first air duct, the top and the side walls of said second air duct, constituting the medial portion of the bottom walls and the inner side walls, respectively, of said first air duct, and a removable bottom wall for said second air duct to afford access to the latter, the side walls of said second air duct being detachably fastened to the inner side walls of said light fixture casings to adapt said second air duct for removal to afford access to said first air duct.

5. In apparatus of the character described, an elongated light fixture casing, a bottom closure pane for said casing, side and end finishing strips for said pane embracing the side and end portions thereof, respectively, the end finishing strips having pockets therein and tongues on one of said side finishing strips secured in said pockets to fasten said last mentioned side finishing strip to said end finishing strips.

6. In apparatus of the character described, an elongated light fixture casing, a bottom closure pane for said casing, side and end finishing strips for said pane embracing the side and end portions thereof, respectively, the end finishing strips having pockets therein, tongues on one of said side finishing strips secured in said pockets to fasten said last mentioned side finishing strip to said end finishing strips, a hinge mounting for said last mentioned side finishing strip adapting the pane to be swung between closed and open positions, and means cooperating with the other side finishing strip to secure the pane in closed position.

7. Apparatus of the character described comprising a first elongated air duct of substantially inverted U-shape in cross section including top and outer side walls, a second elongated air duct beneath the central portion and between the side portions of said first air duct, the top and side walls of said second air duct constituting the bottom and the inner side walls, respectively, of said first air duct, a pair of light fixture casings fastened to the outer side walls of said first air duct and constituting bottom closures for the side portions of said first air duct, the side walls of said second air duct being detachably secured to the inner sides of said light fixture casings to adapt said second air duct for removal to afford access to said first air duct, and a removable bottom wall for said second air duct to afford access to the latter.

8. Apparatus of the character described comprising a first air duct of inverted U-shape in cross section including a top portion and side portions depending therefrom, a second air duct below the top portion and between the side portions of said first mentioned duct, certain walls of each of said ducts constituting certain walls of the other of said ducts, and light fixture elements closing the bottoms of the side portions of said first mentioned duct.

LEONARD R. PHILLIPS.

REFERENCES CITED

The following references are of record in the file of this patent:

UNITED STATES PATENTS

| Number | Name | Date |
|---|---|---|
| 2,304,628 | Damerel | Dec. 8, 1942 |
| 2,434,108 | Handler | Jan. 6, 1948 |

FOREIGN PATENTS

| Number | Country | Date |
|---|---|---|
| 546,008 | Great Britain | June 23, 1942 |